(12) United States Patent
Costa et al.

(10) Patent No.: US 8,145,057 B2
(45) Date of Patent: Mar. 27, 2012

(54) METHOD FOR LOCALIZING AN OPTICAL TERMINATION DEVICE IN A PASSIVE OPTICAL NETWORK

(75) Inventors: Luciana Costa, Turin (IT); Roberta D'Amico, Turin (IT); Paolo De Lutiis, Turin (IT); Luca Viale, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 13/142,726

(22) PCT Filed: Dec. 29, 2008

(86) PCT No.: PCT/EP2008/068309
§ 371 (c)(1),
(2), (4) Date: Jun. 29, 2011

(87) PCT Pub. No.: WO2010/075871
PCT Pub. Date: Jul. 8, 2010

(65) Prior Publication Data
US 2011/0262139 A1    Oct. 27, 2011

(51) Int. Cl.
*H04J 14/00* (2006.01)
*H04B 10/00* (2006.01)
(52) U.S. Cl. .............. 398/67; 398/151; 398/167.5
(58) Field of Classification Search ............. 398/66, 398/67, 151, 165–167
See application file for complete search history.

(56) References Cited

U.S. PATENT DOCUMENTS

| 7,289,731 | B2 | 10/2007 | Thinguldstad | |
|---|---|---|---|---|
| 2009/0010642 | A1* | 1/2009 | Sui et al. | 398/9 |
| 2009/0047013 | A1* | 2/2009 | Effenberger | 398/16 |
| 2009/0129773 | A1* | 5/2009 | Oron | 398/10 |

FOREIGN PATENT DOCUMENTS
EP    1560364 A1    8/2005

OTHER PUBLICATIONS

Written Opinion and International Search Report mailed Nov. 18, 2009, PCT/EP2008/068309.
Gigabit-capable Passive Optical Networks (G-PON): Transmission convergence layer specification; G.984.3 (Feb. 2004), ITU-T Standard in Force (I), International Telecommunication Union, Geneva, CH, No. G.984.3, Feb. 22, 2004.
Gigabit-capable Passive Optical Networks (G-PON): Transmission convergence layer specification; G.984.3 (Mar. 2008), ITU-T Standard in Force (I), International Telecommunication Union, Geneva, CH, No. G.984.3, Mar. 29, 2008.

* cited by examiner

*Primary Examiner* — Nathan Curs
(74) *Attorney, Agent, or Firm* — Banner & Witcoff, Ltd.

(57) ABSTRACT

A method for localizing an optical network termination (ONT) of a passive optical network is disclosed. The passive optical network comprises an optical line terminal (OLT) and an optical distribution network (ODN) having a plurality of optical links. The ONT is connectable to the OLT by a given optical link of the optical distribution network. The method includes the steps of detecting that the ONT has been connected to the OLT by an optical link of the optical distribution network; determining length information indicative of a length of the optical link; comparing the length information with a reference length information indicative of a length of the given optical link; and if the length information matches the reference length information, localizing the ONT by confirming that it is connected to the OLT by the given optical link.

15 Claims, 3 Drawing Sheets

METHOD FOR LOCALIZING AN OPTICAL TERMINATION DEVICE IN A PASSIVE OPTICAL NETWORK

CROSS REFERENCE TO RELATED APPLICATIONS

This is a U.S. National Phase Application under 35 U.S.C. §371 of International Application No. PCT/EP2008/068309, filed Dec. 29, 2008, which was published Under PCT Article 21(2), the entire contents of which are incorporated herein by reference.

TECHNICAL FIELD

The present invention generally relates to the field of optical access networks. In particular, the present invention relates to a method for localizing an optical termination device in a passive optical network. Further, the present invention relates to an optical line terminal (OLT) suitable for implementing the above method and a passive optical network comprising such optical line terminal.

BACKGROUND ART

It is known that Internet Protocol (IP) is becoming one of the most widespread protocols for implementing transport layer in a communication network. In particular, Next Generation Networks (briefly, NGNs) are known, i.e. packet-based networks using IP at their transport layer. Such NGNs are able to make use of multiple broadband, QoS-enabled, transport technologies, while service-related functions are independent of the underlying transport layer technologies. It is expected that NGNs will enable delivery to users of enriched communication services, such as for instance VoIP (Voice Over Internet Protocol), video call, IPTV (Internet Protocol Television) and other multimedia communication services.

A communication network typically comprises a transport backbone and one or more access networks. While, in recent years, the transport backbone has experienced substantial growth, little has changed in the access networks. As a consequence, the "last mile" is still the main bottleneck between high-capacity Local Area Networks (LANs) and the transport backbone.

The most widespread solutions for implementing access networks today are Digital Subscriber Line (briefly, DSL) networks and Cable Modem (briefly, CM) networks. Although these solutions are an improvement compared to 56 Kbps dial-up lines, they are unable to provide enough bandwidth for the above mentioned enriched communication services.

More particularly, neither DSL nor cable modems can keep up with the ever growing bandwidth demand of such enriched communication services, since both technologies are built on top of existing communication infrastructures not optimised for data traffic. Indeed, in CM networks only a few channels are dedicated to transport of data, while the majority of bandwidth is used for transporting analog video signals. As to DSL networks, they do not allow sufficient data rates at required distances, due to signal distortion and crosstalk.

Therefore, most network operators have perceived that a data-centric solution optimised for providing IP-based enriched communication services can be necessary.

Passive Optical Networks (briefly, PONs) and, in particular, Gigabit Passive Optical Networks (briefly, GPONs) are currently considered among the best candidates for implementing access networks suitable for providing such IP-based enriched communication services. PONs are generally considered as an attractive solution to the "last mile" problem, since a PON minimizes the number of optical transceivers, central office terminations and fiber deployment.

A PON is a point-to-multipoint (P2MP) optical network with no active elements in the signals' path from source to destination. The only elements used in a PON are passive optical components, such as optical fiber, splices and splitters.

In particular, a PON typically comprises an optical line terminal (briefly termed OLT) and an optical distribution network (briefly termed ODN). The ODN comprises a plurality of passive optical components (typically spans of silica-based single-mode optical fibers and optical splitters) arranged so as to form a point-multipoint structure having a plurality of optical links radiating from the OLT.

The OLT is suitable for interfacing the ODN with a transport network, such as for instance a metropolitan area network (briefly, MAN) or a wide area network (briefly, WAN).

On the other hand, the ODN is suitable for allowing the OLT to exchange traffic with users connected at the far end of its optical links at transmission rates which can be higher than 100 Mbit/s. This advantageously allows the users to share the usage (and therefore the costs) of the OLT, thus allowing them to access broadband data services and broadband telephone services at acceptable costs.

When a PON is used for FTTB (Fiber To The Building) or FTTC (Fiber To The Curb) applications, each optical link of the ODN is terminated at its far end with a respective Optical Network Unit (briefly, ONU), which may be located either at the basement of a building or at the curb in the proximity of one or more buildings.

On the other hand, when the PON is used for FTTH (Fiber To The Home) applications, each optical link of the ODN has a plug at its far end, which is typically located within the user's home. A user wishing to access the broadband services supported by the PON may simply connect a suitable optical network termination (briefly termed ONT) directly to the plug located in his home, thus terminating the corresponding optical link.

In the present description and in the clams, the expression "optical termination device" will designate an optical device suitable for terminating an optical link of an ODN at its far end, i.e. either a ONU (in case of FTTB or FTTC applications) or a ONT (in case of FTTH applications).

Each time an optical termination device is connected to an optical link of an ODN and is switched on, the optical termination device typically has to be activated at the OLT. In particular, the ITU-T Recommendation G.984.3 (March 2008) discloses that the activation process is performed under the control of the OLT. The process is started by the OLT, which periodically checks for possible activation of new optical termination devices and/or possible reactivation of switched-off optical termination devices. According to the above mentioned ITU-T Recommendation G.984.3, the activation procedure includes three phases: Parameter Learning, Serial Number Acquisition, and Ranging.

During the Parameter Learning phase, the optical termination device, while remaining passive, acquires operating parameters to be used in the upstream transmission.

During the Serial Number Acquisition phase, the OLT discovers possible new optical termination devices by opening a window for upstream transmission (called "ranging window") and asking for serial number transmission. In this ranging window, new optical termination devices send their respective serial numbers to the OLT. Upon reception of each serial number, the OLT associates it with an unused optical termination device identifier and sends it to the corresponding optical termination device.

The ITU-T Recommendation G.984.3 (March 2008), paragraph 7.2.2 discloses two methods for acquiring the serial number of an optical termination device.

According to a first method ("Configured-SN"), the serial number of the optical termination device is manually recorded at the OLT by the network provider before the optical termination device is switched on for the first time. Therefore, when the OLT detects the optical termination device, it retrieves from it its serial number and checks whether the retrieved serial number is one of the already stored ones. In the affirmative, the OLT activates the optical termination device, while in the negative the OLT stops the activation procedure.

On the other hand, according to the second method ("Discovered-SN"), the serial number of the ONT is automatically retrieved by the OLT when the optical termination device is detected for the first time. In particular, when the OLT detects the optical termination device, it retrieves from it its serial number and checks whether the retrieved serial number is one of the already stored ones. In the affirmative, the OLT activates the optical termination device, while in the negative the OLT determines that the optical termination device is being activated for the first time. In this latter case the OLT stores the retrieved serial number and activates the optical termination device.

During the Ranging phase, the OLT measures the optical distance between itself and each optical termination device, whose aim is described in detail herein after.

Transmission from optical termination devices to an OLT (which is also termed "uplink" or "upstream" transmission) is typically based on a Time Division Multiplexing technique. According to this technique, the OLT assigns to each optical termination device a respective "upstream frame", i.e. a time frame during which the optical termination device is allowed to transmit upstream traffic to the OLT. Upstream frames of different optical termination devices are non-overlapping thereby allowing collisions of upstream traffic generated by different optical termination devices connected to the same OLT to be avoided.

Typically, during the above Ranging phase, the OLT retrieves from the optical termination device a set of physical parameters allowing the upstream frame to be assigned to the optical termination device to be determined. One of the most significant physical parameters for determining the upstream frame is the "round trip delay". i.e. the time required for transmitting an optical signal from the OLT to the optical termination device and for receiving at the OLT a further optical signal in response to the optical signal from the optical termination device. For instance, the ITU-T Recommendation G.984.3 (March 3/2008), paragraph 10.4.3.3, discloses a procedure for measuring the round trip delay associated to an optical termination device, during the above Ranging phase.

SUMMARY OF THE INVENTION

The Applicant has noticed that, disadvantageously, when an optical termination device is connected to an optical link, the ODN has no way to physically localize the optical termination device i.e. to identify the specific optical link to which the termination device is connected. Indeed the activation of an optical termination device simply requires connecting it to an optical link of an ODN. However, the point-to-multi-point nature of the PON, in which passive optical splitters are used to enable a single optical fiber acting as a shared medium for multiple optical termination devices, disadvantageously does not allow to determine the optical link to which a specific optical termination device has been connected. An operator has therefore no means to check the real physical position of the deployed devices.

This may disadvantageously allow a number of fraudulent uses of the optical termination device, especially in case of the above mentioned FTTH applications, where the ONT cannot be physically protected, since it is managed directly by the user.

According to such FTTH applications, a user may subscribe a given communication service (e.g. broadband Internet access), together with an ONT. Upon subscription, the user is enabled to access the requested service (e.g. assuming that his/her physical location is already provided with the plug allowing the ONT to the ODN to be connected).

However, since the PON is not able to determine the optical link to which the optical termination device is actually connected, the ONT may be stolen by a malicious entity and then relocated by connecting it to another optical link of the ODN serving the user's home. In this way, disadvantageously, the malicious entity may fraudulently access the communication services in place of the user, without the service provider may become aware of this, since the physical position of the ONT is not monitored.

Besides, the user may decide to share the use of the ONT (and then the access to the subscribed communication services) with one or more other users residing in homes served by the same ODN, by simply moving the ONT from one home to the other. In this way, disadvantageously, a group of users residing in an area served by the same ODN can freely share a single subscription and a single ONT. This may be not acceptable for a service provider, since a subscription (and then the ONT sold or leased together with the subscription) is intended for a single user, and not for sharing among different users.

In view of the above, it is therefore important to determine that an ONT which has been bought or provided by the service provider to a user is always used by connecting it to a same optical link.

U.S. Pat. No. 7,289,731 discloses an ONT which can automatically determine its own geographic location information by means of a GPS component, thereby permitting the ONT to automatically report its geographic location to a manager entity in a PON.

However, the Applicant has noticed that the above solution is hardly applicable from a practical point of view for localizing ONTs. Indeed, the ONTs are typically placed within the users' homes, i.e. in indoor environments where the GPS signal may be too weak for allowing determination of the geographic position.

Accordingly, the Applicant has tackled the problem of providing a method for localizing an optical termination device of an optical access network (in particular, but not exclusively, a PON), which is applicable also when the optical termination device is located in an indoor environment, such as for instance (but not exclusively) an ONT connected to a PON for FTTH applications.

According to embodiments of the present invention, this problem is solved by storing at the OLT a reference round trip delay calculated during the Ranging phase when the optical termination device is activated for the first time.

Each time a fault occurs in the ODN (e.g. a fibre has been cut or a device has been unplugged) and a loss of signal condition is declared by the OLT, a new ranging phase is performed and consequently a new round trip delay is measured. The new round trip delay is then checked against the reference round trip delay. If the new round trip delay substantially matches the reference round trip delay, the OLT determines that the optical termination device has not been relocated.

Otherwise, the OLT determines that the optical termination device has been relocated, and accordingly takes proper actions (such as forcing deactivation of the optical termination device or requiring the authentication). The new round trip delay is stored and used to update the reference round trip delay.

This advantageously prevents a stolen optical termination device from being relocated, e.g. by a malicious entity, and then used for fraudulently accessing the optical access network. Besides, this advantageously prevents a group of users from sharing the usage of a same optical termination device.

Using the round trip delay for determining possible relocation of the optical termination device is advantageous in that the round trip delay is calculated during the standard Ranging procedure. The activation process described by the ITU-T G.984.3 therefore does not have to be modified.

The round trip delay is a time value depending on the distance of the optical termination device from the OLT. Accordingly, any variation of it may indicate a change in the location of the optical termination device. The OLT can also directly estimate the actual distance of the optical termination device (expressed e.g. in meters) based on the round-trip measurement, as described in G.9843 (March 2008) at paragraph 10.3.6. This distance may be stored and used for monitoring the location on the optical termination device, instead of the round trip delay.

The round trip delay measurement performed during the Ranging phase as defined by the ITU-T G984.3 is merely exemplary. Indeed, any length information may be used, i.e. any information which is indicative of the optical length of the optical link by means of which the optical termination device should be connected to the OLT. For instance, the distance between the optical termination device and the OLT may be measured by using suitable apparatuses external to the OLT, such as for instance an OTDR (Optical Time Domain Reflectometer).

The optical length takes into account the physical length and refractive index of optical fiber spans included in the optical distribution network, and possible phase contributions due to other optical components of the optical distribution network (e.g. the optical splitters).

According to a first aspect, the present invention provides a method for localizing an optical termination device of a passive optical network, the passive optical network comprising an optical line terminal and an optical distribution network having a plurality of optical links, the optical termination device being connectable to the optical line terminal by means of a given optical link of the optical distribution network, the method comprising the following steps:

a) detecting that the optical termination device has been connected to the optical line terminal by means of an optical link of the optical distribution network;

b) determining length information indicative of a length of the optical link;

c) comparing the length information with a reference length information indicative of a length of the given optical link; and d) if the length information matches the reference length information, localizing the optical termination device by confirming that the optical termination device is connected to the optical line terminal by means of the given optical link.

In the description and in the claims, the expression "the length information matches the reference length information" means that the difference between the length information and the reference length information is comprised within a predefined range whose average value is zero.

Preferably, step a) comprises:

e) performing a first ranging phase upon the optical termination device when the optical termination device is switched on for a first time;

f) measuring a first length information between the optical termination device and the optical line terminal during the ranging phase; and g) assuming the first length information as the reference length information.

Preferably, step g) comprises:

h) retrieving an identifier of the optical termination device; and i) storing an association between the reference length information and the identifier in an association table cooperating with the optical line terminal.

Profitably, step b) comprises:

l) repeating the ranging phase upon the optical termination device;

m) measuring the length information between the optical termination device and the optical line terminal during the repeated ranging phase;

and step d) comprises:

n) if the length information matches the reference length information, updating the reference length information by using the length information.

Preferably, step l) comprises, during the repeating ranging phase, using the identifier for retrieving the reference length information stored in the association table.

Profitably, step d) comprises:

o) calculating an absolute value of a difference between the reference length information and the length information; and p) when the absolute value is lower than or equal to a threshold, confirming that the optical termination device is connected to the optical line terminal by means of the given optical link.

Profitably, if the length information does not match the reference length information, the method further comprises:

q) confirming that the optical termination device is not connected to the given optical link, r) giving an alarm notifying that the optical termination device has been relocated, and s) updating the reference length information by using the length information in order to localize a new position of the optical termination device.

Preferably, the method a comprises storing the reference length information and the identifier in an association table located at the optical line terminal.

Preferably, the method comprises storing the reference length information, the identifier and an OLT identifier identifying an optical line terminal from which the optical termination device has been activated, in a centralized association table accessible by the optical line terminal and by a further optical line terminal belonging to another distributed passive optical network.

Preferably, the method comprises a step of storing the length information in a history database for statistical purposes and/or for tuning the threshold.

Preferably, the length information is selected between a round trip delay and a fibre distance.

Preferably, step c) comprises determining the reference length information as an arithmetic average of previously determined values of the length information.

According to a second aspect, the present invention provides an optical line terminal for a passive optical network, the passive optical network being configured for being connectable to an optical distribution network having a number of optical links, the optical line terminal being configured for:
a) detecting that an optical termination device connectable to the optical line terminal by means of a given optical link of the optical distribution network has been connected to the optical line terminal by means of an optical link of the optical distribution network;
b) determining a length information indicative of a length of the optical link;
c) comparing the length information with a reference length information indicative of a length of the given optical link; and
d) if the length information matches the reference length information, localizing the optical termination device by confirming that the optical termination device is connected to the optical line terminal by means of the given optical link.

According to a third aspect, the present invention provides a passive optical network comprising:
an optical line terminal,
an optical distribution network having a number of optical links, and
an optical termination device connectable to the optical line terminal by means of the optical distribution network,
wherein the optical line terminal is as set forth above.

According to a fourth aspect, the present invention provides a computer program comprising computer program code means adapted to perform the following steps, when the program is run on an optical line terminal for a passive optical network, the passive optical network comprising an optical distribution network having a number of optical links:
a) detecting that an optical termination device connectable to the optical line terminal by means of a given optical link of the optical distribution network has been connected to the optical line terminal by means of an optical link of the optical distribution network;
b) determining a length information indicative of a length of the optical link;
c) comparing the length information with a reference length information indicative of a length of the given optical link; and
d) if the length information matches the reference length information, localizing the optical termination device by confirming that the optical termination device is connected to the optical line terminal by means of the given optical link.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
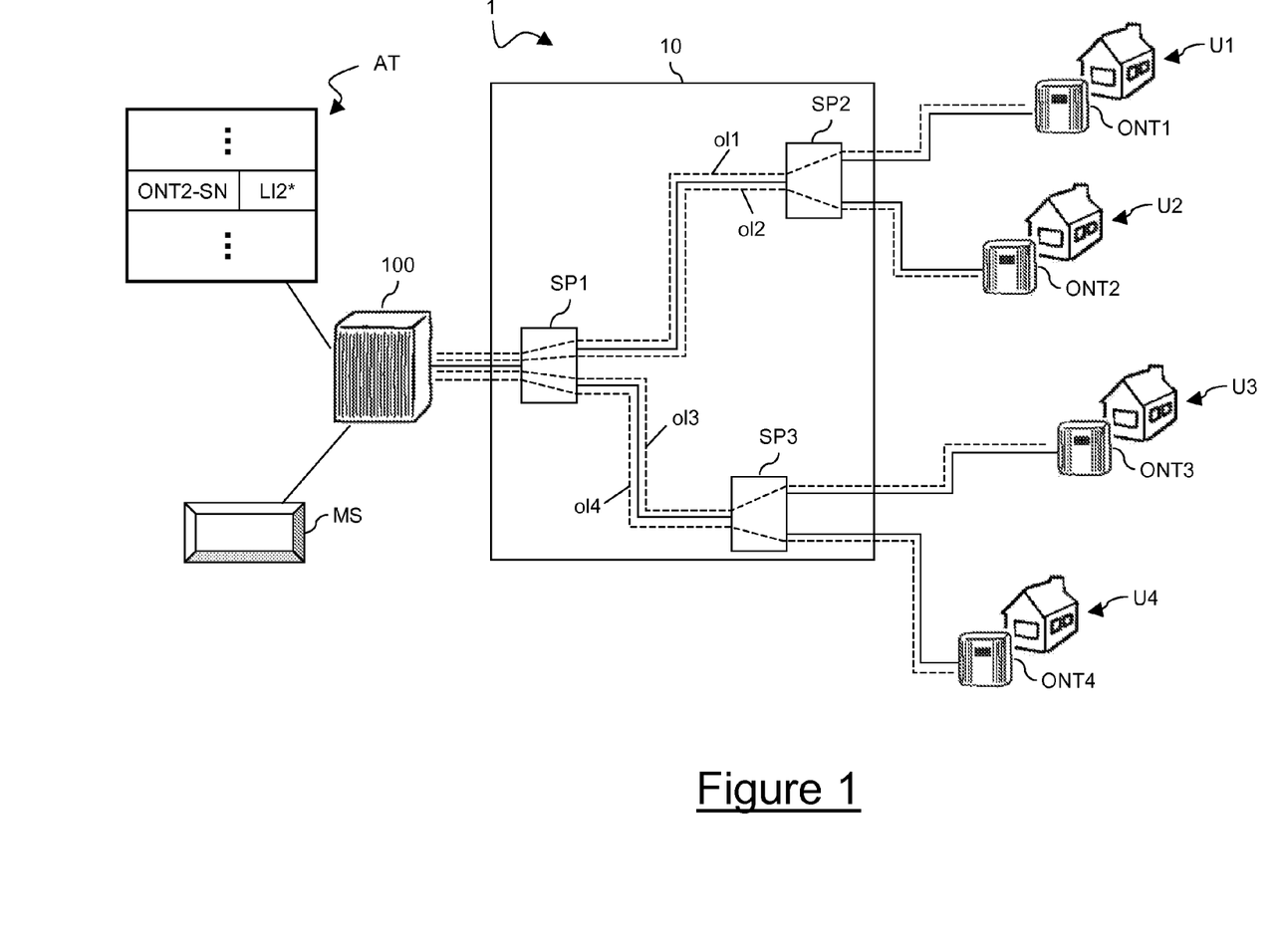
FIG. 1 schematically shows a PON for FTTH applications.

FIG. 1 schematically shows a PON 1 which, by way of example, is suitable for FTTH applications. This is not limiting, since the PON 1 may be used for other applications, such as the above mentioned FTTC and FTTB. The PON 1 preferably comprises an ODN 10 and an OLT 100.

Preferably, the ODN 10 comprises three optical splitters SP1, SP2 and SP3. The optical splitter SP1 has an optical input connected to the OLT 100 and two optical outputs. The optical splitter SP2 has an optical input connected to one of the optical outputs of the optical splitter SP1 and two optical outputs. Similarly, the optical splitter SP3 has an optical input connected to the other optical output of the optical splitter SP1 and two optical outputs. The optical inputs and outputs of the optical splitters SP1, SP2 and SP3 preferably comprise respective spans of silica-based single-mode optical fiber. The above arrangement substantially forms four different optical links ol1, ol2, ol3 and ol4, which are indicated in FIG. 1.

The ODN 10 shown in FIG. 1 is merely exemplary. Indeed, as mentioned above, an ODN generally comprises optical passive components arranged so as to form a point-multipoint structure radiating from the OLT. Also the number of optical outputs in the splitter is merely exemplary; it depends on the splitting factor adopted.

Preferably, each optical link ol1, ol2, ol3 and ol4 may be terminated by a respective optical termination device ONT1, ONT2, ONT3 and ONT4. Since is has been assumed that the PON 1 is suitable for FTTH applications, each optical link ol1, ol2, ol3 and ol4 terminates within a respective user's home U1, U2, U3 and U4 with a respective plug, which for simplicity is not shown in FIG. 1. Besides, each of the optical termination devices ONT1, ONT2, ONT3 and ONT4 is an ONT which may be supplied by the service provider as part of the contract activation or bought by a user and connected to one of the above plugs. FIG. 1 shows a situation in which each optical termination device ONT1, ONT2, ONT3 and ONT4 is connected to a respective optical link ol1, ol2, ol3 and ol4.

Preferably, the OLT 100 is suitable for cooperating with an association table AT. Preferably, the association table AT comprises, for each optical termination device which has been activated at the OLT 100, a row comprising an identifier of the optical termination device (for example its Serial Number SN) and a reference length information associated thereto, which is indicative of a reference length of the optical link by means of which the optical termination device should be connected to the OLT 100.

For simplicity, in the association table AT of FIG. 1, only an identifier ONT2-SN of the optical termination device ONT2 and its associated reference length information LI2* are depicted. The association table AT may be stored in a local database of the OLT 100, or it may be stored in a centralized database located e.g. at the central office of the PON 1, which centralized database may be accessed by the OLT 100. The advantage of this latter configuration will be described herein after by referring to FIG. 3. Also the role of the association table AT will be described in detail herein after.

Preferably, the OLT 100 is also suitable for cooperating with a monitoring system MS, located e.g. at the central office of the PON 1. Also the role of the monitoring system MS will be described in detail herein after.

By referring to FIG. 2, the method for localizing one of the optical termination devices ONT1, ONT2, ONT3 and ONT4 connected to the PON 1 according to an embodiment of the present invention will be described in detail.

In particular, it is assumed that the user residing in the user's home U2 buys a subscription for a given communication service distributed by means of the PON 1 of FIG. 1. Further, as mentioned above, upon subscription the user either buys the optical termination device ONT2 or receives it from the service provider as part of the contract activation.

Preferably, the optical termination device ONT2 has an identifier ONT2-SN, which univocally identifies it. For instance, the identifier ONT2-SN may be the serial number of the optical termination device ONT2.

After subscription of the communication services, the user may access the services by connecting the optical termination device ONT2 to the optical link o12 which terminates with the plug located in his home U2, as shown in FIG. 1, and switching it on.

According to embodiments of the present invention, each time the optical termination device ONT2 is connected to the ODN 10 and is switched on (step 200a), it is detected by the OLT 100, which then starts an activation procedure (step 201). Preferably, during the activation procedure of step 201, the OLT 100 preferably performs the above mentioned Parameter Learning and Serial Number Acquisition phases. Preferably, during the Serial Number Acquisition phase, the OLT retrieves the identifier ONT2-SN from the optical termination device ONT2.

Preferably, the Serial Number Acquisition phase is implemented according to any of the above mentioned methods disclosed by the ITU-T Recommendation G.984.3 (March 2008), paragraph 7.2.2 Therefore, if the Serial Number Acquisition phase is based on the above mentioned "Configured-SN", the OLT 100 checks whether the retrieved identifier ONT2-SN corresponds to one of the already registered identifiers. In the affirmative, the OLT 100 allocates to the ONT2-SN a free identifier. In the negative, the OLT 100 stops the activation procedure. Otherwise, if the Serial Number Acquisition phase is based on the above mentioned "Discovered-SN", the OLT 100 checks whether the retrieved identifier ONT2-SN corresponds to one of the identifiers stored during the precedent activations. In the negative, it extracts the ONT2-SN and allocates to it a free identifier, that will be used to address the following transmissions toward the optical termination device ONT2. The OLT 100 also creates in the association table AT a new row comprising the identifier ONT2-SN and continues the activation of the optical termination device ONT2, through the Ranging phase.

According to embodiments of the present invention, during step 202, the OLT starts the Ranging procedure for the optical termination device ONT2. The OLT 100 determines a length information LI2 indicative of the length of the optical link connecting the optical termination device ONT2 to the OLT 100. Preferably, the length information LI2 is the round trip delay of the transmission between the OLT 100 and the optical termination device ONT2. More preferably, the round trip delay is measured during the Ranging phase according to the above mentioned procedure disclosed by the ITU-T Recommendation G.984.3 (March 2008), paragraph 10.4.3.3.

Then, preferably, the OLT 100 determines whether the switching-on operation performed during step 200a is the first switching-on of the optical termination device ONT2 or, in other words, whether steps 201 and 202 correspond to the first time the optical termination device ONT2 undergoes the activation procedure (step 203).

In particular, the OLT 100 preferably performs step 203 by using the identifier ONT2-SN retrieved during the activation procedure of step 201 as search key in the association table AT for checking whether a reference length information LI2* associated to the identifier ONT2-SN is already stored in the association table AT. In the negative, the OLT 100 determines that the switching-on operation performed during step 200a is the first switching-on of the optical termination device ONT2.

If, during step 203, the OLT 100 determines that the switching-on operation performed during step 200a is the first switching-on of the optical termination device ONT2, it preferably stores in the association table AT a reference length information LI2* associated to the identifier ONT2-SN (step 204), which reference length information LI2* is preferably set equal to the length information LI2 determined during step 202.

Then, the OLT 100 concludes the Ranging procedure by sending a ranging time message RT to the optical termination device ONT2 with the ranging parameters (step 205). The optical termination device ONT2 is then activated (step 206). The ranging time message RT is preferably a Ranging_Time message compliant to the ITU-T Recommendation G.984.3 (March 2008), paragraph 9.2.3.4.

After step 206, the OLT 100 preferably stores in a history database DB not shown in FIG. 1 (step 211) an association between the measured length information LI2 determined during step 202 and the identifier ONT2-SN.

If, during step 203, the OLT 100 determines that the switching-on operation performed during step 200a is not the first switching-on of the optical termination device ONT2, the OLT 100 then reads from the association table AT the reference length information LI2* associated to the identifier ONT2-SN (step 207).

Then the OLT 100 preferably compares the reference length information LI2* stored in the association table AT with the length information LI2 determined during step 202 (step 208), for checking whether the length information LI2 has an acceptable value, i.e. a value that differs from the reference length information LI2* by ±T or less. T is a threshold defining a range in which the length information LI2 can vary without such variation being interpreted as a change of location of the optical termination device ONT2. For instance, T may be of 1 meter.

Step 208 may be performed by using several mathematical/statistical approaches.

In particular, during step 208 the OLT 100 can, for example, calculate the absolute value |LI2*−LI2| of the difference between the reference length information LI2* and the length information LI2 determined during step 202, and compare this absolute value |LI2*−LI2| with a threshold T. The threshold T related to a specific ODN can be tuned, for example, according to the length information LI2 stored in the history database DB.

If the absolute value |LI2*−LI2| is lower than or equal to the threshold T, the OLT 100 determines that the optical termination device ONT2 is still connected to the same optical link to which it was connected the first time it was switched on, i.e. the optical termination device ONT2 has not been relocated. Therefore, the OLT 100 preferably updates the reference length information LI2* stored in the association table AT (step 212), using the value measured at step 202 (e.g. calculating an incremental arithmetic average or by simply substituting the previous reference length information LI2* value with the length information LI2 measured at step 202). This advantageously allows to take into account possible changes of the reference length information LI2* due to variations of the environmental conditions of the PON 1, such as e.g. temperature changes and/or aging.

Finally the OLT 100 preferably completes the activation of the optical termination device ONT2 by performing the above mentioned step 205 of sending a ranging time message RT to the optical termination device ONT2 with the ranging parameters, and the above mentioned step 211 of storing in the history database DB the association between the length information LI2 measured during step 202 and the identifier ONT2-SN.

Otherwise, if the absolute value |LI2*−LI2| is higher than the threshold T, the OLT 100 determines that the optical termination device ONT2 is connected to an optical link different from that to which it was connected the first time it was switched on, i.e. the optical termination device ONT2 has been relocated. In this case, preferably, the OLT 100 does not complete the activation procedure of the optical termination device ONT2 and sends an alert to the console of the monitoring system MS (step 209) in order to notify to the service provide that the optical termination device ONT2 has been relocated.

The OLT 100 then ends the Ranging procedure according to the service provider policy. For example, the OLT 100 may send to the optical termination device ONT2 a deactivate message DM with an option "reset", that instructs the optical termination device ONT2 to stop transmissions and to reset itself (step 209a). The deactivate message DM may be a Deactivate ONU_ID message as defined in the ITU-T Recommendation G.984.3 (March 2008), paragraph 9.2.3.5. Steps 209a is merely exemplary, since the service provider may decide how to manage this situation. For example, the service provider can deny the connection or, if any authentication procedure is available, the service provider can require an additional authentication phase. For instance, the OLT may request to the optical termination device ONT2 a password or an authentication code, allowing the OLT to check whether relocation implies a fraudulent use of the optical termination device ONT2.

As an alternative choice, the service provider may also decide to continue the Ranging procedure, even if the absolute value |LI2*−LI2| is higher than the threshold T. In this case, the service provider can use the measured length information LI2 only for statistical purposes or for "on site" checks. What it is important is that the service provider is capable of monitoring any variation in the distance measures.

After the ranging procedure, that means after step 209 and/or 209a, the OLT 100 may optionally update the reference length information LI2* stored in the association table AT (step 210) using the length information LI2 measured at step 202 (e.g. by calculating an incremental arithmetic average or by simply substituting the previous reference length information LI2* with the measured length information LI2). This allows the service provider to consider the length information LI2 measured at step 202 as the new reference length information, thus avoiding generation of alarms each time the optical termination device ONT2 is switched on from its new location.

More in particular, in case the reference length information LI2* is the round trip delay between the OLT 100 and the optical termination device ONT2, the above mentioned ITU-T Recommendation G.984.3 (March 2008), paragraph 10.1.1 discloses that this round trip delay typically comprises two contributions:
- the round-trip propagation delay, which is proportional to the optical termination device ONT2's fibre optical distance from the OLT (the optical distance or length takes into account the physical length and refractive index of optical fiber spans included in the optical distribution network, and possible phase contributions due to other optical components of the optical distribution network, e.g., the optical splitters); and
- the optical termination device ONT2 response time that the OLT 100 obtains via the OMCC (ONU Management and Control Channel).

Therefore, a variation of any of these contributions induces a variation on the overall round trip delay.

In particular, a temperature variation occurring in a portion of the optical link connecting the OLT 100 and the optical termination device ONT2 may induce a variation of the effective index experienced by optical signals propagating in such a portion, thereby affecting the optical fiber propagation delay.

Finally, after the step 210, the OLT 100 preferably performs step 211 of storing the length information LI2 in the historical DB in the row corresponding to identifier ONT2-SN for statistical purposes. As mentioned above, the stored length information LI2 can be also used for tuning, for example, the threshold T value related to a specific ODN.

Therefore, advantageously, the service provider is capable of determining whether the optical termination device ONT2 is always connected to the same optical link of the ODN 10, by looking to the console of the monitoring system MS for an alert generated when the length of the optical link connecting the optical termination device ONT2 to the OLT 100 is different from a reference value.

This advantageously allows fraudulent uses of the optical termination device ONT2, especially in case of FTTH applications to be prevented.

Indeed, if a malicious entity steals the optical termination device ONT2, connects it to another link of the ODN 10 and tries to activate it, the OLT 100 determines that the optical termination device ONT2 has been relocated by determining that the optical length of the optical link connecting the optical termination device ONT2 to the OLT 100 is changed, and then stops the activation of the optical termination device ONT2. This advantageously prevents the malicious entity who stole the optical termination device ONT2 from using it for accessing the communication services in place of the user.

Besides, if a user who bought or is provided with an optical termination device ONT2 lends it to another user who connects it to another link of the ODN 10 and tries to activate it, the OLT 100 determines that the optical termination device ONT2 has been relocated by determining that the optical length of the optical link connecting the optical termination device ONT2 to the OLT 100 is changed. In this case, the OLT sends an alert to the console of the monitoring system MS, in order to notify the service provider that the optical termination device ONT2 has been relocated, and then terminates the activation according to the policy of the service provider, for example stopping the activation of the optical termination device ONT2. This advantageously prevents the user from relocating his/her ONT to the purpose of sharing his subscription to broadband services with other users. In this way, the service provider may be certain that each subscription to a given broadband services is actually enjoyed by a single user from a single location (i.e. from a single plug).

Figure 2:
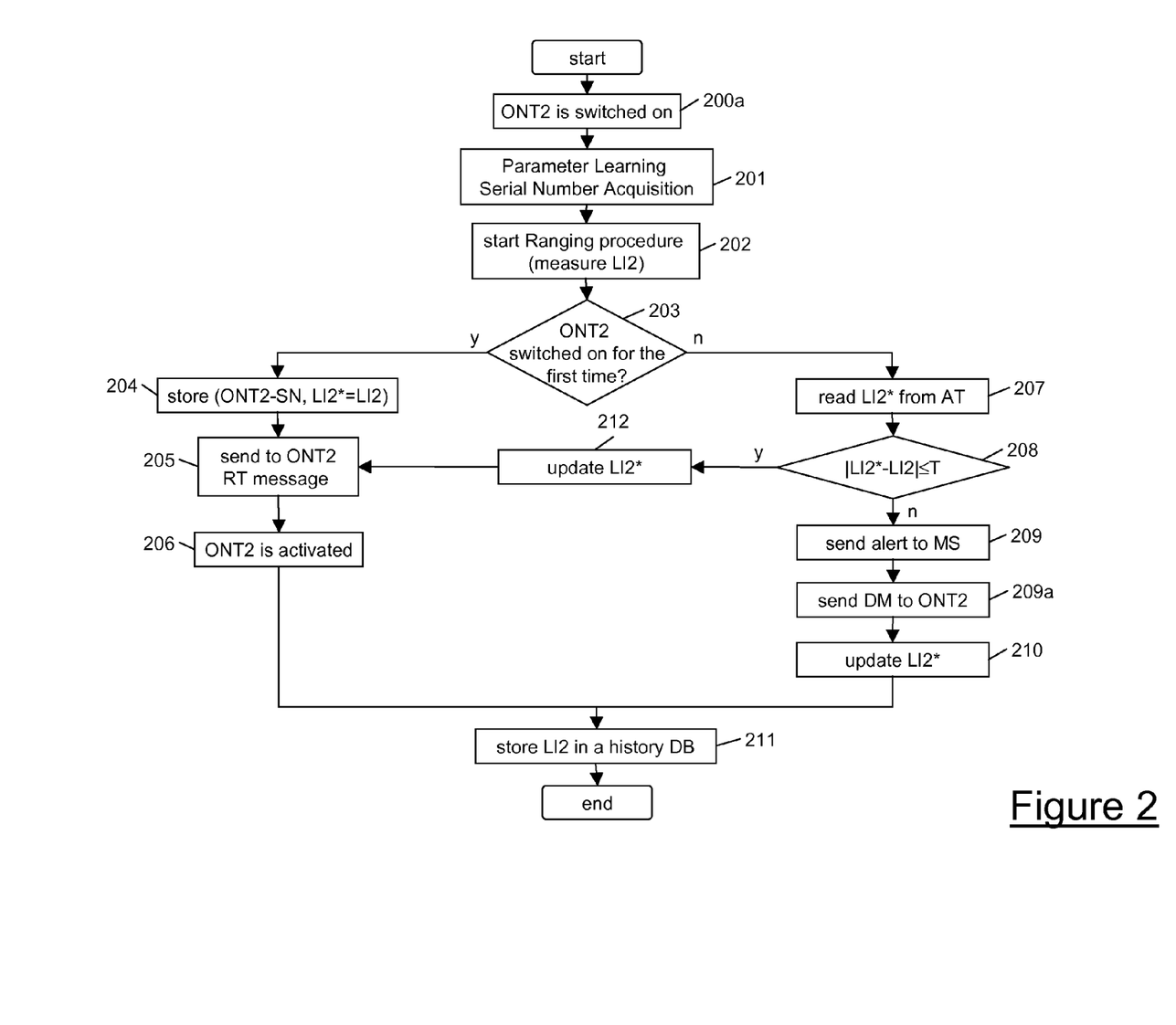
FIG. 2 is a flow chart of the method according to an embodiment of the present invention, applied to the PON of FIG. 1.

Further, advantageously, the above described procedure shown in FIG. 2 may be implemented with few modifications to the activation procedure performed by known OLTs. Indeed, as described above, determination of the length information associated to the optical termination device (in particular, its round trip delay) is already provided in the known activation procedure during the Ranging phase, since such a length information is presently used by the OLT for determining the upstream frame to be assigned to the optical termination device. Therefore, no additional information has to be acquired at the OLT from the optical termination device. This advantageously implies that the above method substantially has a minimal impact on the duration of the known activation procedure of an optical termination device at an OLT.

Moreover, the above method is automatically performed by the OLT and the optical termination device, without requiring any manual intervention by the user. Indeed, the OLT automatically acquires the length information from the optical termination device and autonomously processes it for determining whether the optical termination device has been relocated.

According to advantageous embodiments, the procedure shown in FIG. 2 is repeated each time the OLT 100 performs a ranging procedure, e.g. when the optical termination device is detected after a loss of signal. The loss of signal can happen when a break occurs in the ODN (e.g. a fibre is cut or unplugged), and a loss of signal condition is declared by the OLT for each of the ONTs that are cut off from it by the break. A loss of signal may be due also to a power black-out. This advantageously allows it to be checked that the optical termination device ONT2 has not been relocated during the power black-out period.

As mentioned above, the step 208 of comparing the reference length information LI2* stored in the association table AT and the length information LI2 determined during step 202 comprises comparing |LI2*−LI2| with a threshold T. The threshold T is therefore indicative of the resolution of the subject method for localizing the optical termination device ONT2.

Indeed, when the distance between the optical termination device ONT2 and the OLT 100 varies such that the associated length information LI2 varies of less that ±T, the OLT 100 concludes that the optical termination device ONT2 is always connected to a same optical link of the ODN 10. In other words, when the optical termination device ONT2 is moved from a first optical link to a second optical link, relocation of the optical termination device ONT2 is detected by the OLT 100 only if the length information LI2 determined when the optical termination device ONT2 is connected to the second optical link varies of more than ±T from the first optical link. Otherwise, the OLT 100 determines that the detected variation of the length information LI2 is due to other reasons, such as aging and/or temperature variations.

The value of the threshold T is then preferably set by the network provider by taking into account both the desired resolution of the method, and the variations that the length information LI2 may reasonably undergo due to aging and/or temperature variations. In particular, the threshold T is selected such that variations of the length information LI2 due to aging and/or temperature variations are not interpreted by the OLT 100 as a relocation of the optical termination device ONT2.

Therefore, the higher the expected variations of the length information LI2 due to aging and/or temperature variations, the higher is the threshold T and therefore the lower is the resolution of the method for localizing the optical termination device ONT2.

In some cases, the maximum resolution ±T which may be reached is not enough for detecting possible relocations of the optical termination device ONT2. For instance, it may happen that relocations of the optical termination device ONT2 from a first optical link to a second optical link of the ODN 10 (e.g. from the optical link o12 terminating within the user's home U2 to the optical link oi1 terminating within the user's home U1) induces a variation of the length information LI2 which is lower than ±T.

In this case, the capability of the OLT 100 to determine possible relocations of the optical termination device ONT2 is preferably restored by increasing the difference between the optical lengths of the optical link o12 and the optical link o11.

For instance, this may be achieved by inserting a span of optical fiber at the far end of the optical link o12. The span of optical fiber may be inserted e.g. in the form of a fiber spool installed at the plug within the user's home U2. The length of the span of optical fiber is preferably chosen so that relocation of the optical termination device ONT2 from the optical link o12 to the optical link oi1 induces a variation of the length information LI2 which is higher than ±T.

In this way, advantageously, the OLT 100 may detect possible relocations of the optical termination device ONT2 from the optical link o12 to the optical link oi1 and vice versa.

Figure 3:
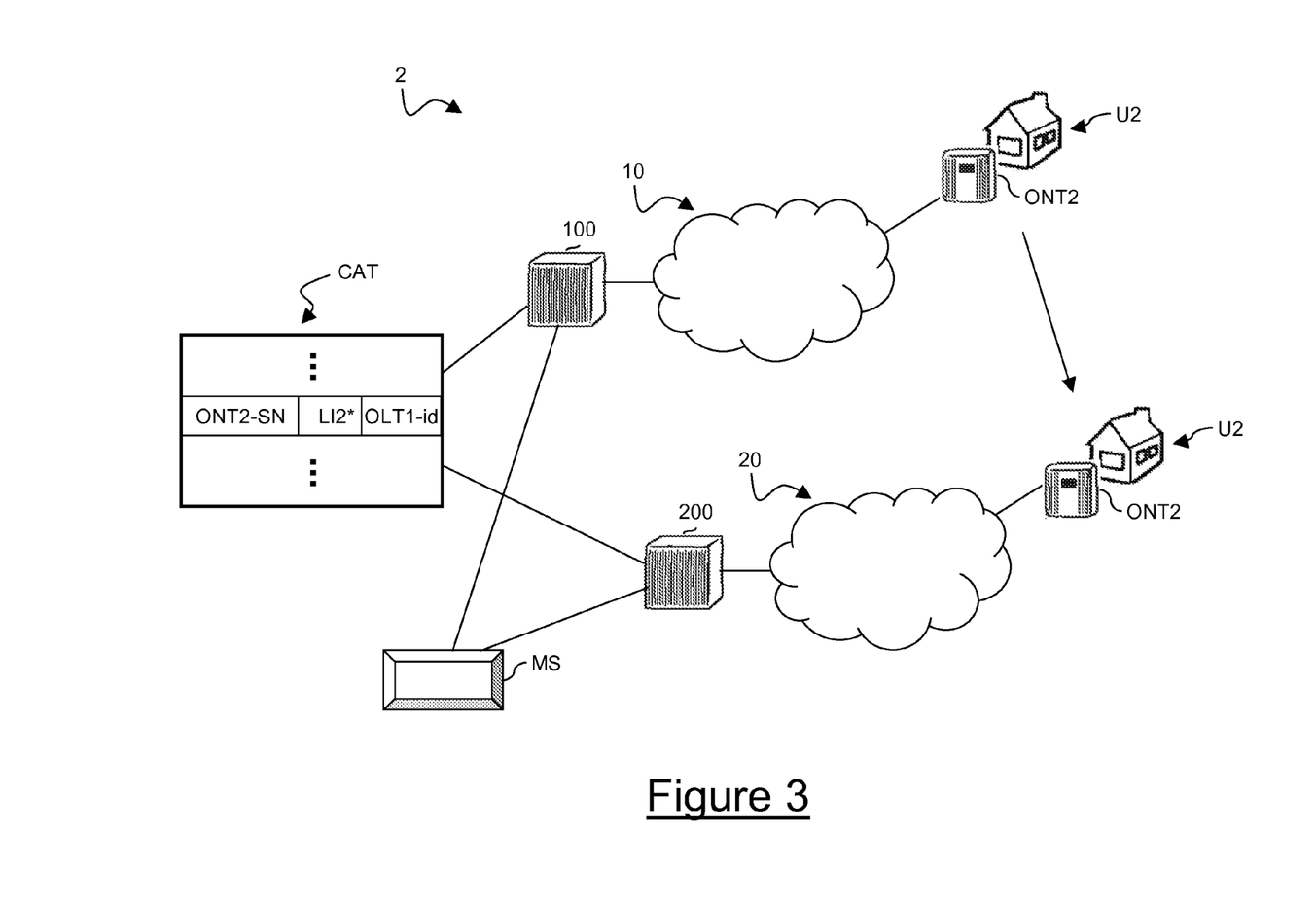
FIG. 3 schematically shows a centralized architecture for localizing an optical termination device in a distributed PON.

FIG. 3 schematically shows a centralized architecture for localizing an optical terminal device in a distributed PON 2.

The distributed PON 2 of FIG. 3 comprises a first OLT 100, a second OLT 200, a first ODN 10 connected to the first OLT 100 and a second ODN 20 connected to the second OLT 200. The detailed structure of the ODNs is not shown in FIG. 3, for not overloading the Figure.

Preferably, both the first OLT 100 and the second OLT 200 are suitable for cooperating with a centralized association table. In this case, the first OLT 100 and the second OLT 200, beside the local association table AT used for storing the measured lengths information related to the respective optical termination devices, uses a centralized association table CAT. The centralized association table CAT is external to the OLTs, for example is located inside the monitoring system MS and is accessible by the first OLT 100 and second OLT 200. Both the first OLT 100 and the second OLT 200 store, also in the centralized association table CAT, the measured length information related to the respective termination devices, keeping them updated. Preferably, the centralized association table CAT comprises, for each optical termination device which has been activated at the OLT 100 or at the OLT 200, a row comprising the identifier of the optical termination device (for example its serial number), an OLT identifier identifying the OLT from which it has been activated and a reference length information associated thereto, which is indicative of a reference length of the optical link by means of which the optical termination device should be connected to the OLT from which it has been activated. For simplicity, by assuming that the optical termination device ONT2 has been activated by the first OLT 100, the centralized association table CAT of FIG. 3 comprises a row with an identifier ONT2-SN of the optical termination device ONT2, its associated reference length information LI2* and an OLT identifier OLT1-id identifying the first OLT 100.

According to this second embodiment, it is possible to determine whether the optical termination device ONT2, that has been activated by the first OLT 100 (and therefore is connected to the first ODN 10) is relocated by connecting it to another ODN of the distributed PON 2, i.e. the second ODN 20.

For example, when the second OLT 100 determines that a new optical termination device (i.e. the optical termination device ONT2) is connected to it, it firstly looks in the centralized association table CAT for determining whether if the new optical termination device ONT2 is associated with another OLT. In this case, it determines that that the new optical termination device (i.e. the optical termination device ONT2) was originally associated to the first OLT 100. Accordingly, the second OLT 200 generates an alarm, which may be visualized by the monitoring system MS to inform the network operator of a possible fraudulent use of the optical termination device ONT2. The above example is only a possible implementation, because the procedure for managing a new optical termination device originally associated to another OLT is highly dependent on the ONT provisioning mechanism implemented by each vendor.

Therefore, in this case, the centralized association table CAT acts as a shared association table storing all the length information by every OLT of the distributed PON for each ONTs connected to it. This advantageously prevents a user from relocating an ONT by unplugging it from an OLT and connecting it to a different one.

The described logic for detecting a change in the ONT localization can be implemented into the OLT 100, as described before, or can be implemented externally to the OLT 100, for example in the monitoring system MS.

In the first case, the OLT 100 only interacts with the monitoring system MS in order to give an alarm when it detects a change in the ONT localization.

In the second case, the OLT 100 interacts with the monitoring system MS in order to synchronize with it. In this case, the monitoring system MS implements the detection logic, generates an alarm and, according to the policy of the service provider, instructs the OLT 100 regarding to steps to be taken in case of relocation of the ONT.

The invention claimed is:

1. A method for localizing an optical termination device of a passive optical network, said passive optical network comprising an optical line terminal and an optical distribution network having a plurality of optical links, said optical termination device being connectable to said optical line terminal by a given optical link of said optical distribution network, said method comprising the following steps performed by said optical line terminal:
   a) detecting that said optical termination device has been connected to said optical line terminal by an optical link of said optical distribution network, performed by said optical line terminal;
   b) determining length information indicative of a length of said optical link;
   c) comparing said length information with a reference length information indicative of a length of said given optical link; and
   d) if said length information matches said reference length information, localizing said optical termination device by confirming that said optical termination device is connected to said optical line terminal by said given optical link.

2. The method according to claim 1, wherein said step a) comprises:
   e) performing a first ranging phase upon said optical termination device when said optical termination device is switched on for a first time;
   f) measuring a first length information between said optical termination device and said optical line terminal during said ranging phase; and
   g) assuming said first length information as said reference length information.

3. The method according to claim 2, wherein said step g) comprises:
   h) retrieving an identifier of said optical termination device; and
   i) storing an association between said reference length information and said identifier in an association table cooperating with said optical line terminal.

4. The method according to claim 3, wherein said step b) comprises:
   l) repeating said ranging phase upon said optical termination device;
   m) measuring said length information between said optical termination device and said optical line terminal during said repeated ranging phase;

and wherein said step d) comprises:
   n) if said length information matches said reference length information, updating said reference length information by using said length information.

5. The method according to claim 4, wherein said step l) comprises: during said repeating ranging phase, using said identifier for retrieving said reference length information stored in said association table.

6. The method according to claim 1, wherein said step d) comprises:
   o) calculating an absolute value of a difference between said reference length information and said length information; and
   p) when said absolute value is lower than or equal to a threshold, confirming that said optical termination device is connected to said optical line terminal by said given optical link.

7. The method according to claim 1, further comprising:
   if said length information does not match said reference length information,
   q) confirming that said optical termination device is not connected to said given optical link,
   r) giving an alarm notifying that said optical termination device has been relocated, and
   s) updating said reference length information by using said length information in order to localize a new position of said optical termination device.

8. The method according to claim 3, further comprising storing said reference length information and said identifier in an association table located at said optical line terminal.

9. The method according to claim 3, further comprising storing said reference length information, said identifier and an OLT identifier identifying an optical line terminal from which the optical termination device has been activated, in a centralized association table accessible by said optical line terminal and by a further optical line terminal belonging to another distributed passive optical network.

10. The method according to claim 6, further comprising storing said length information in a history database for statistical purposes and/or for tuning said threshold.

11. The method according to claim 1, wherein said length information is selected between a round trip delay and a fibre distance.

12. The method according to claim 1, wherein said step c) comprises determining said reference length information as an arithmetic average of previously determined values of said length information.

13. An optical line terminal for a passive optical network, said passive optical network being configured for being connectable to an optical distribution network having a number of optical links, said optical line terminal being configured for:
   a) detecting that an optical termination device connectable to said optical line terminal by a given optical link of said optical distribution network has been connected to said optical line terminal by an optical link of said optical distribution network;
   b) determining length information indicative of a length of said optical link;
   c) comparing said length information with a reference length information indicative of a length of said given optical link; and
   d) if said length information matches said reference length information, localizing said optical termination device by confirming that said optical termination device is connected to said optical line terminal by said given optical link.

14. A passive optical network comprising:
an optical line terminal according to claim 13,
an optical distribution network having a number of optical links, and
an optical termination device connectable to said optical line terminal by said optical distribution network.

15. A non-transitory computer readable medium having a computer program stored thereon that, when executed on an optical line terminal for a passive optical network comprising an optical distribution network having a number of optical links, performs the steps of:
a) detecting that an optical termination device connectable to said optical line terminal by a given optical link of the optical distribution network has been connected to said optical line terminal by an optical link of said optical distribution network;
b) determining length information indicative of a length of said optical link;
c) comparing said length information with a reference length information indicative of a length of said given optical link; and
d) if said length information matches said reference length information, localizing said optical termination device by confirming that said optical termination device is connected to said optical line terminal by said given optical link.

* * * * *